United States Patent

Klink et al.

[11] Patent Number: 5,589,290
[45] Date of Patent: Dec. 31, 1996

[54] BATTERY BOX WITH FLUID FLOW CHANNELS TO MAINTAIN PROPER TEMPERATURE

[75] Inventors: Rainer Klink, Kernen; Johann German; Wolfgang Warthmann, both of Weinstadt, all of Germany

[73] Assignee: Deutsche Automobilgesellschaft mbH, Germany

[21] Appl. No.: 400,105

[22] Filed: Mar. 6, 1995

[30] Foreign Application Priority Data

Mar. 4, 1994 [DE] Germany .................. 44 07 156.6

[51] Int. Cl.$^6$ ........................................ H01M 2/10
[52] U.S. Cl. .................. 429/99; 429/72; 429/159
[58] Field of Search .................. 429/96, 99, 100, 429/72, 148, 159, 62, 120; 206/333

[56] References Cited

U.S. PATENT DOCUMENTS

| | | | |
|---|---|---|---|
| 3,745,048 | 7/1973 | Dinkler et al. | 429/120 |
| 3,928,080 | 12/1975 | Aronson | 429/81 |
| 5,212,024 | 5/1993 | Klink et al. | 429/72 |
| 5,521,022 | 5/1996 | Petzl | 429/97 |

FOREIGN PATENT DOCUMENTS

| | | |
|---|---|---|
| 0533317 | 3/1993 | European Pat. Off. . |
| 4029018 | 3/1992 | Germany . |
| 4116253 | 6/1992 | Germany . |

OTHER PUBLICATIONS

European Search Report dated Jul. 5, 1995.

Primary Examiner—Anthony Skapars
Attorney, Agent, or Firm—Evenson, McKeown, Edwards & Lenahan P.L.L.C.

[57] ABSTRACT

The invention relates to a battery box having a plurality of orientation-independent electrochemical cells. Within the battery box, the cells are arranged horizontally, cells which are located one above the other being combined to form a cell group having flow channels arranged between adjacent cells. The flow channels of a cell group are connected via a transverse inlet flow channel to a distributor channel and via a transverse outlet flow channel to a collecting channel, the collecting channel being arranged with respect to the battery box on the side opposite the distributor channel.

11 Claims, 3 Drawing Sheets

BATTERY BOX WITH FLUID FLOW CHANNELS TO MAINTAIN PROPER TEMPERATURE

BACKGROUND AND SUMMARY OF THE INVENTION

The invention relates to a battery box of the type having a plurality of interconnected cells with fluid flow channels arranged therebetween, for the purpose of maintaining a uniform desired temperature.

DE 41 16 253 C1 discloses a battery box of the generic type, in which the individual cells are combined to form cell groups and are supported, standing vertically, on the base side on ledges. A flow channel is formed by a separation between the sides of the cells in order to keep the individual cells at an appropriate temperature. The flow channels are connected to a distributor channel arranged in the base region of the battery box, and to a collecting channel, arranged in the region of the cover of the battery box. Each of the distributor channels is connected to the outside of the battery box via apertures arranged in the wall of the battery box.

A uniform flow through the flow channels must be achieved in order to assure that the individual cells are held at an appropriate temperature so that the battery box operates well. For this purpose, the free cross-section of the distributor channel reduces in the direction of the fluid flow, which keeps the cells at an appropriate temperature, and the cross-section of the collecting channel increases in the flow direction.

When battery boxes of this type are used for traction batteries in battery powered vehicles, it is necessary to optimize the use of existing physical space. In the case of a battery box of the generic type having vertical cells, it is, however, frequently impossible to increase the capacity or the voltage by arranging cells one above the other, for example in a second level, since this arrangement occupies at least double the physical height, and sufficient clearance is frequently not available (for example, for installation in a car boot or for underfloor installation). In addition, such a design creates problems with keeping the cells at an appropriate temperature, as well as with metrological detection of the temperature and of the voltage of the cells and cell groups.

The object of the invention is to provide an improved battery box of the generic type, in which utilization of the available physical space is made easier or improved, without adversely affecting the monitoring or control of cell temperatures.

The object is achieved according to the invention by a battery box in which a plurality of orientation independent cells (that is, cells which are operable in any orientation) are stacked horizontally relative to the installed position of the battery. This arrangement results in improved utilization of the height of the physical space which is available for the installation of the battery box, since the required physical height is only a multiple of the cell thickness and not of the cell height. Because the transverse flow channels are designed to provide for the fluid which keeps the cells at an appropriate temperature (especially of gases such as air etc.), the way in which the cells were previously kept at an appropriate temperature continues to be maintained.

In addition, this arrangement facilitates metrological monitoring of the battery box. That is, since the cells, which are combined to form cell groups, are fitted in a geometrically similar manner, a certain uniformity exists with respect to heat transfer and flow technology, and depending on the size of the cell groups, it is sufficient under some circumstances to use only one measurement signal for the temperature and/or the voltage as a measurement variable, for each cell group. Thus, as a result of the layered construction of the cell groups within the battery box, the individual stacks can be monitored, (for example, by detection of the fluid flowing through) with respect to temperature, flow rate, flow volume and voltage of the stack, in a simple manner in small units. More accurate localization is thus possible when a defect occurs. Furthermore, the incorporation of detectors for this purpose is simplified since their cables which pass to the exterior can be passed along the walls of the transverse flow channels, so that they form only a minor (and in general negligible) flow resistance for the cooling fluid.

The term cell groups is to be understood to mean a plurality of cells which are aligned in the vertical direction or stacked in the vertical direction over a base area. It is thus possible to form the base area (which also corresponds to the cover area) from a single cell, with a plurality of cells one behind the other, from a plurality of cells side by side, or from a combination of these two possibilities.

Other objects, advantages and novel features of the present invention will become apparent from the following detailed description of the invention when considered in conjunction with the accompanying drawings.

DETAILED DESCRIPTION OF THE DRAWINGS

Figure 1:
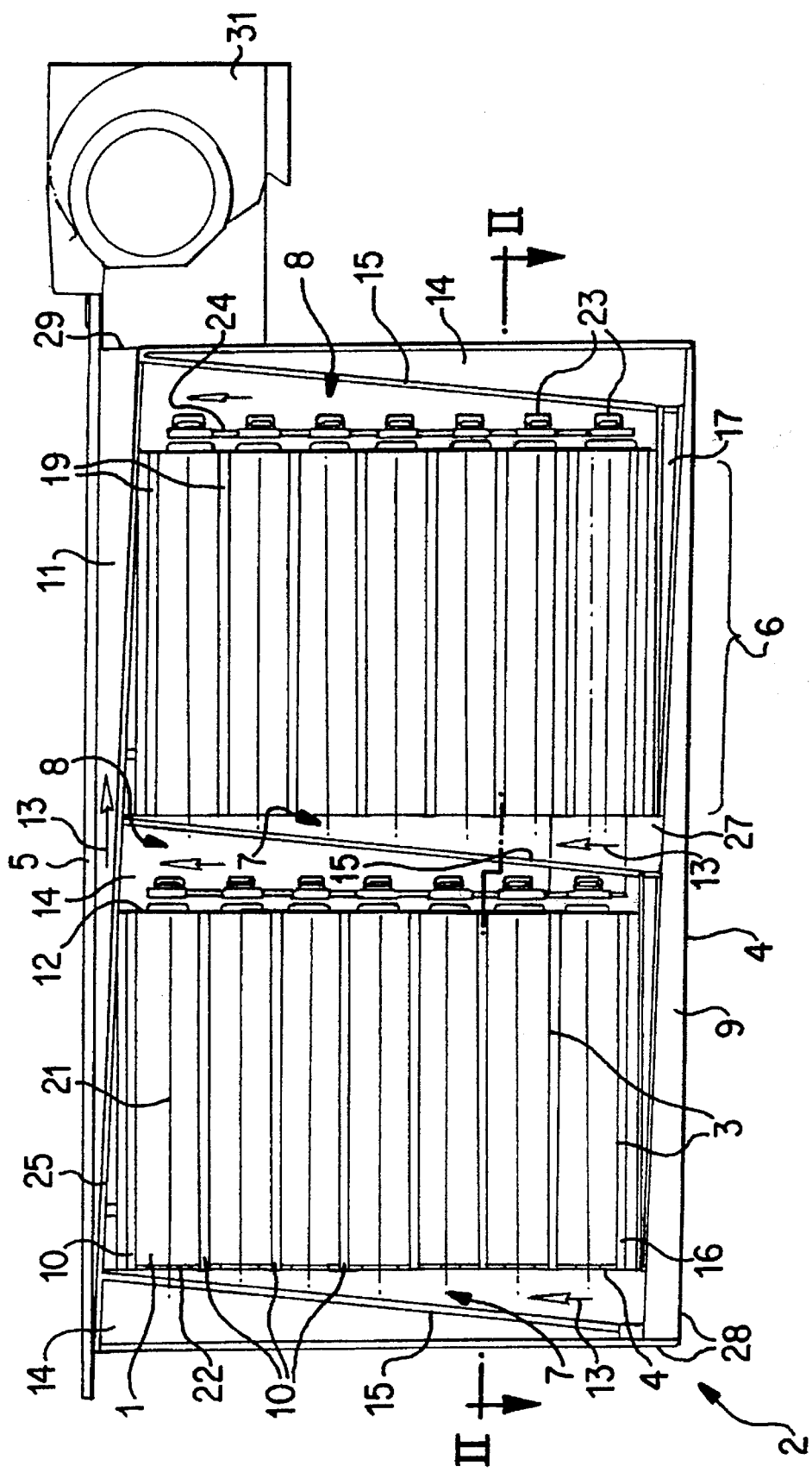
FIG. 1 shows a vertical longitudinal section through a battery box along the line I—I in FIG. 2.

FIG. 1 illustrates a vertically running longitudinal section through a battery box 2 according to the invention, in whose interior a plurality of electrochemical stores are arranged as cells 1, which are constructed to be operable independent of their orientation. The parallelepiped cells 1, whose poles 23 emerge at one of their ends 12 are aligned one above the other in the vertical direction, the alignment line being formed by the smallest edge of the cell 1 (the base edge 22 formed between the narrow side 21 of the cell 1 and the base or the cover of the cell 1). Thus, the cells 1 are arranged horizontally within the battery box 2, with their flat side 3 approximately parallel to the base 4 and to the cover 5 of the battery box 2.

All the cells 1 which are arranged in such a manner above a cell 1 are combined to form a cell group, with a flow channel 10, formed by a separation between the flat sides 3 of adjacent cells 1, arranged between each of the individual cells 1 of a cell group 6. The mutual and uniform separation between the flat sides 3 of the cells 1, which forms the flow channels 10, is advantageously implemented by means of bearing strips 19 which project slightly into the parallel flow channel 10 and are arranged on cell group walls 20 (see FIG. 2) which are arranged along the narrow sides 21 of the cells 1.

In order to simplify assembly, three cell groups 6 are arranged laterally adjacent to one another on their narrow sides 21 and are electrically connected to one another outside the battery box 2 in a simple manner to form a cell module in the desired manner—in series, in parallel or in a combination thereof—by means of pole connectors 24.

In order to reinforce the battery box 2, and for mutual insulation of the cell groups 6 which may be required, a cell group wall 20, from which bearing strips 19 arranged on both sides for the cells 1 project, is arranged between each of the laterally adjacent cell groups 6. For external initial assembly of a cell module, a cell group wall 20 is likewise arranged on the outer cell groups 6, with bearing strips 19 projecting only inwardly. As a result of this arrangement, inter alia, a cell module can not only be connected, outside the battery box 2, to pole connector 24, but can also be initially assembled with ready-constructed flow channels 10 between adjacent cells 1 of a cell stack 6.

Figure 2:
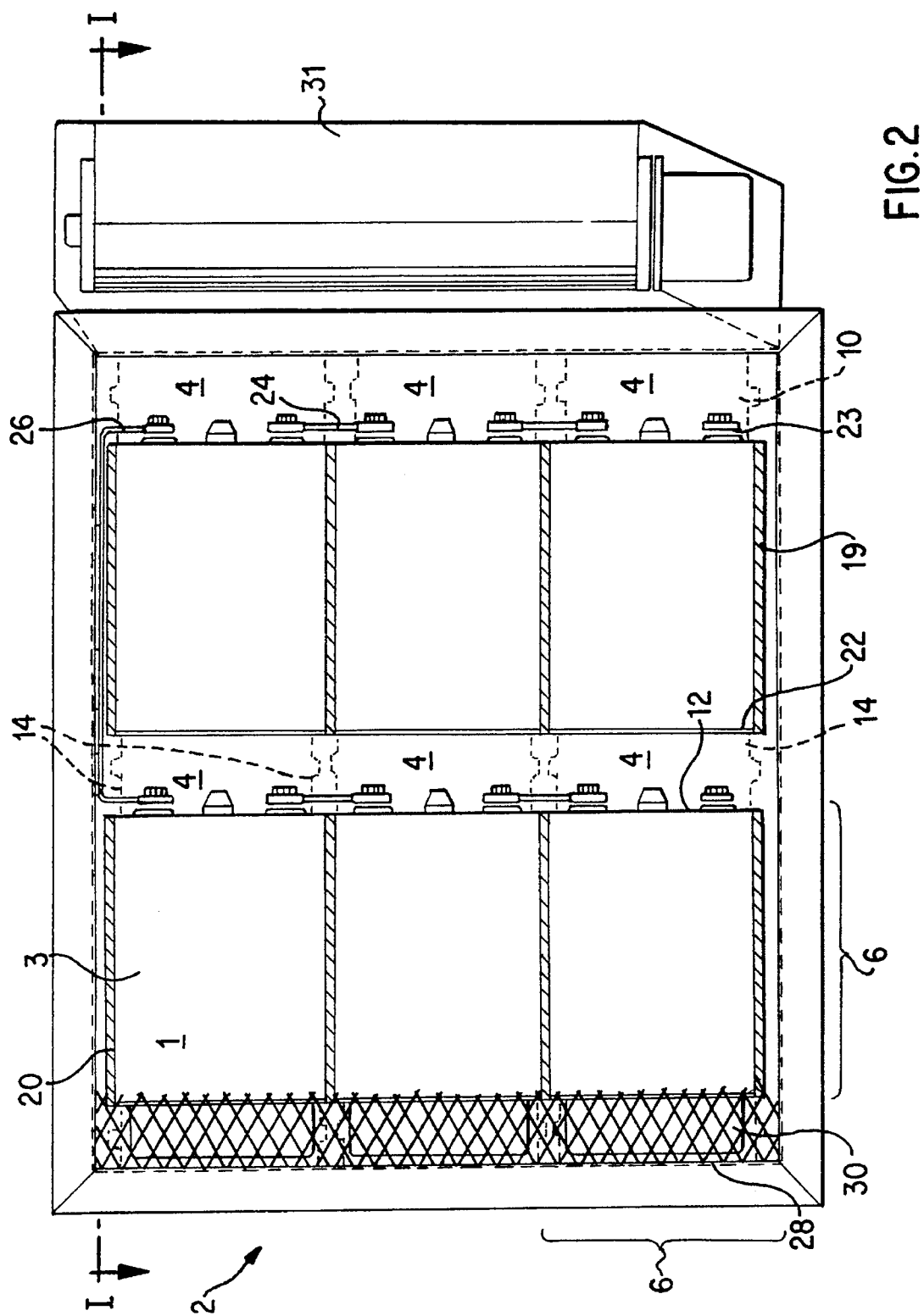
FIG. 2 shows a horizontal section through the battery box according to FIG. 1 with the guide plates removed and spacer bars illustrated by dashed lines, along the line II—II in FIG. 1.

FIG. 2 shows a horizontal section of the battery box, in which two cell modules are arranged on the pole bolt side in the battery box 2. Since the poles 23 of the cells 1 are arranged on one end of the cells 1, they are arranged end to end one behind the other and with a mutual separation from one another.

The bottom cell 1 of a cell group 6 of the cell module is placed on a supporting ledge 16 (FIG. 1), which ensures separation, of a sealing plate 17 which is arranged above the base 4 of the battery box 2. In order that each of the cells 1 which is at the bottom of a cell group 6 is subject to the same conditions, a flow channel 8 is also in each case formed between the sealing plate 17 and these bottom cells 1.

For the same reasons, a covering plate 25 is arranged above the top cell 1 of a cell stack 6 and is spaced apart from the top cell 1 to form a flow channel 10. In order to further stabilize the battery box 2, and to secure the orientation of the cells 1 within the battery box 2, the covering plate 25 is expediently supported at an oblique angle in the form of a wedge against the top cell 1.

The cell modules which are placed on the sealing plates 17 are subsequently electrically connected to one another by means of module connectors 26, which can be installed easily, since the ends 12 of the cells 1 which are fitted in the battery box 2 and on which the poles 23 of the cells 1 emerge, are easily accessible because of the separation between the cell modules and an end separation of the cell modules from the opposite walls of the battery box 2.

In order to ensure the separation of the cells modules from each other and from the walls at the ends of the battery box 2, spacer bars 14 (shown by dashed lines in FIG. 2) are inserted between adjacent cell modules and between the cell modules and the ends of the battery box 2, after the cell modules have been installed therein. These spacer bars 14 each rest on the edge of the base side edge 22 of the individual cells 1 of the cell groups 6, and thus also serve to reinforce the battery box 2 and secure the orientation of the individual cells 1.

The spacer bars 14 have guide grooves 18 into which guide plates 15 can be inserted, forming transverse flow channels 7, 8 with the ends 12 of the cells 1 of a cell stack 6. The transverse flow channels 7, 8, which are connected in fluid communication with the flow channels 10 of a cell stack 6, are divided into a transverse inlet flow channel 7 and a transverse outlet flow channel 8, at opposite ends of the cells 1. Thus, for each cell group 6, the battery box 2 has two dedicated transverse flow channels 7, 8 assigned exclusively thereto.

In some cases it can also be advantageous for a battery box for a cell module formed from a plurality of cell groups 6 to have a single transverse inlet flow channel and a single transverse outlet flow channel, both of which extend over the entire width of the module, since in this way it is possible to save weight. In such a construction of a battery box, the arrangement which is designated as a cell module in the exemplary embodiment according to FIGS. 1 and 2, of the cells 1 can be regarded as a cell group having three cells 1 arranged laterally on one another, instead of a single cell 1 as the base area.

In order to maintain a uniform flow of a fluid in the flow channels 10, and keep the cells at an appropriate temperature, the guide grooves 18 are arranged at an oblique angle (inclined relative to the vertical direction), so that the transverse inlet flow channels 7 have a cross-section through which flow can pass freely which tapers in the flow direction 13, and the transverse outlet flow channels 8 have a cross-section through which flow can pass freely which widens in the flow direction 13. Because the fluid which is to flow through the uppermost flow channels 10 of a cell group 6 in FIG. 1 must first flow past the lower tier fluid channels 10, it is apparent that the volume of fluid which flows at the lower portion of the transverse inlet flow channel 7 will be greater than that at the top, and hence tapering of the transverse inlet flow channels 7, 8 in this manner facilitates a smooth fluid flow.

In order to avoid uncontrolled flow in this case, the transverse inlet flow channels 7 are advantageously sealed off in the region of the last cell 1 (relative to the flow direction 13) of a cell group 6, and the transverse outlet flow channels 8 are sealed off in the region of the first cell 1 (in the flow direction 13) of a cell group 6. Thus, in the exemplary embodiment according to FIGS. 1 and 2, the transverse inlet flow channel 7 is sealed with respect to the covering plate 25, and the transverse outlet flow channel 8 is sealed with respect to the sealing plate 17. This sealing is expediently carried out by the guide plate 15 being fitted in a sealing manner on the corresponding sealing plate 17 or on the covering plate 25 respectively.

This construction of the transverse flow channels 7, 8 offers the advantage that the module connectors 26 can be fitted more easily, since the guide plates 15 are not installed in the guide grooves 18 of the spacer bars 14 until after the module connectors 26 have been fitted.

The battery box 2 has a distributor channel 9 arranged on the base side, below the sealing plate 17, which is connected in fluid communication with the transverse inlet flow channel 7 via, for example, opening 27 arranged in the sealing plate 17. Similarly, a collecting channel 11 is arranged in the region of the cover 5, above the covering plate 25, and is connected in fluid communication with the transverse outlet flow channels 8 of the cell groups 6, for the outlet flow of the air which is produced in the transverse outlet flow channel 8, which is arranged on the pole bolt side, that is to say on the cover side with respect to the cells 1.

The battery box 2 is provided with inlet flow opening 28 and an outlet flow opening 29 at the start of the distributor channel 9 and at the end of the collecting channel 11, for the fluid to flow into or out of respectively. In order to minimize the entry of dirt into the interior of the battery box 2 (which increases the flow resistance of the various channels), the inlet opening 28 is expediently covered by a grid 30.

In order to maintain the cells 1 at an appropriate temperature (which is expediently done using air), the fluid thus flows via inlet flow opening 28, through the distributor channel 9 into the transverse inlet channels 7 of the cells groups 6. From there, it passes via the flow channels 10 into the transverse outlet flow channels 8 of the cell groups 6, from where the fluid passes into the collecting channel 11, and exits through outlet flow opening 29. To facilitate a uniform fluid flow into the flow channels 10 (and make it possible to maintain the cells 1 at a uniform desired temperature within the battery box), the distributor channel 9 has a cross-section which becomes smaller in the flow direction 13, and the collecting channel 11 has a cross-section which widens.

Cells 1 such as dry cells, recombination cells, gel cells or the like, especially gas-tight cells 1 with a bound electrolyte, are suitable as electrochemical stores which can be used in a favorable manner.

In the case of cells 1 which must be kept at an appropriate temperature in an intensive manner, for good heat transfer it is expedient to use cells 1 having a metal housing, in which case it is expedient to manufacture the bearing strips 19, and/or the supporting ledges 16 and/or the cell group walls 20, which are arranged between the individual cell groups 6 of a cell module, and/or the spacer bars 14 and/or the walls of the battery box 2 and/or the sealing plate 17 and/or the covering plate 25 from an insulating material.

Furthermore, in the case of such cells 1 which must be kept at an appropriate temperature in an intensive manner, it is favorable to provide an injection fan on the inlet flow side and/or (as illustrated in the exemplary embodiment according to FIGS. 1 and 2), a suction fan 31 on the outlet flow side. A blower, a pump or the like can also be used instead of a fan 31.

In order to monitor the functioning of the cells 1, it is expedient to arrange detectors in a cell-group-specific manner on the spacer bars 14, and to pass the necessary cables via the sealing plate 17 and/or the covering plate 25 to the outlet, so that only a minor flow resistance results. It is also advantageous to construct the sealing plate 17 and/or the covering plate 25, which are constructed in the form of a wedge, to be hollow internally and to pass the cable in these cavities.

Figure 3:
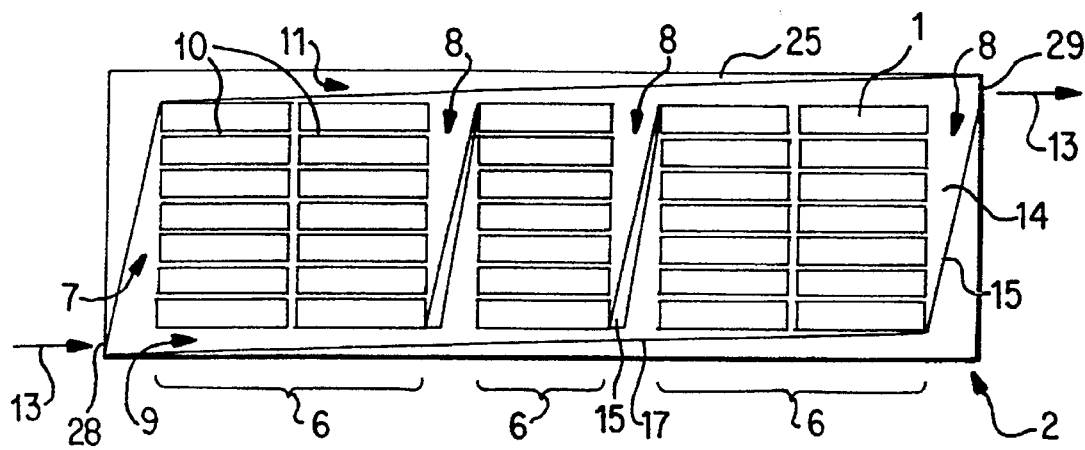
FIGS. 3 to 5 are schematic illustrations of various options for the arrangement of the cells within a battery box according to the invention.
Figure 4:
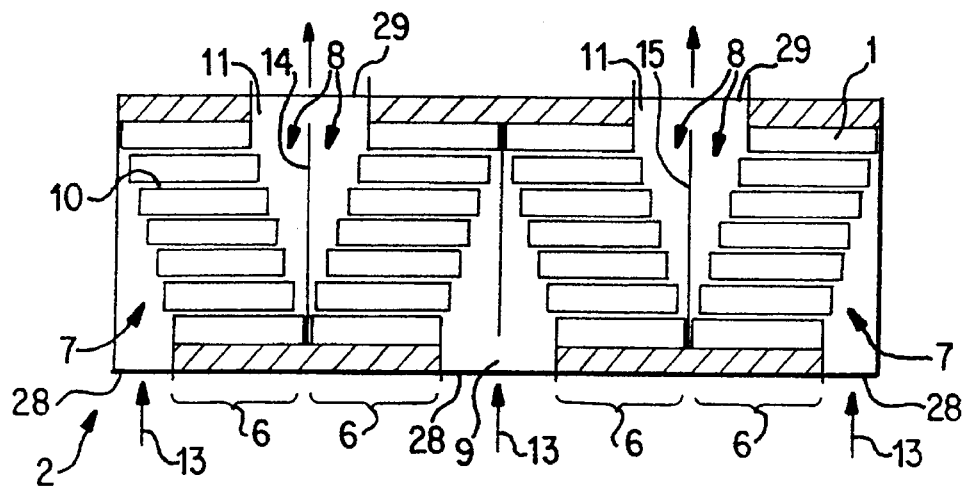
Figure 5:
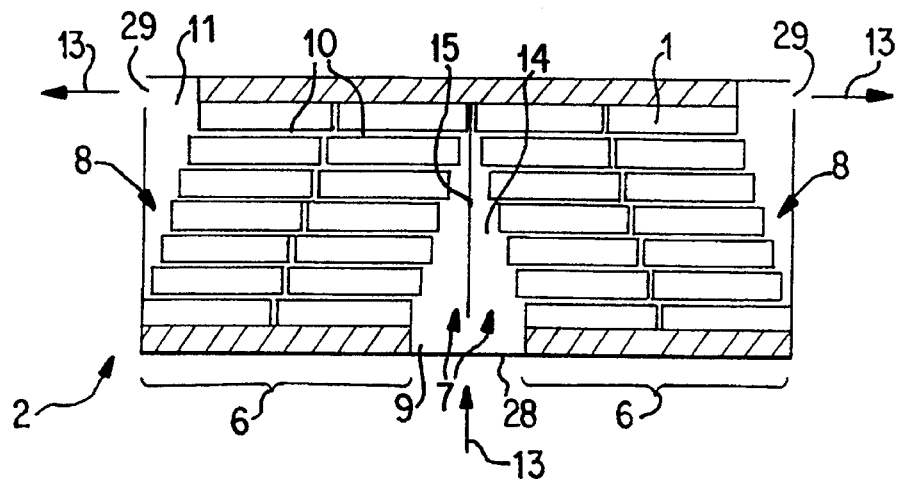

FIGS. 3 to 5 show a side view of various alternatives for the arrangement of cells 1, having differently formed cell groups 6 within a schematically illustrated battery box 2 according to the invention.

FIG. 3 illustrates a battery box 2 in which three cell groups 6 are arranged. For space reasons, the two outer cell groups 6 have a base area comprising two cells 1 which are arranged end to end one behind the other, with the ends where there is no pole resting against one another to form an intermediate space. The alignment of the cells 1 which are arranged one above the other is furthermore parallel to the base edge 22 (FIG. 2) of the cells 1. The intermediate space between the cells 1, which are arranged one behind the other, of this base area is filled to ensure the robustness of the cell group. Furthermore, the unobstructed opening width of the flow openings 10 can be varied slightly thus ensuring that flow passes around the cells 1 of such a cell group. In the case of cells 1 having metallic housings, the filling of the intermediate space can at the same time be utilized for insulation purposes, for example, by the insertion of an insulating material. The inlet flow opening 28 of the distributor channel 9 is furthermore located, as in the exemplary embodiment illustrated in FIGS. 1 and 2, diagonally opposite the outlet flow opening 29 of the collecting channel 11.

In the battery box 2 according to FIG. 4, the base area of each of the four cell groups 6 is formed by a single cell 1.

The alignment line of the cells 1 stacked one above the other in these cell groups 6 is, however, inclined transversely relative to the vertical direction. Thus, in this embodiment, the guide plates 15 can be aligned and inserted in the vertical direction. Furthermore, the battery box 2 has three inlet flow openings 28, two of which are arranged on the edge on the battery box 2 and supply a transverse inlet flow channel 7 directly, via a small distributor channel which is formed by the walls of the inlet openings 28 in the battery box. The third inlet opening is arranged centrally in the base 4 of the battery box 2, with the associated distributor channel 9 being constructed underneath the bottom cell 1 in each case. The total of two outlet flow openings 29 are arranged in the cover 5 of the battery box 2, with the respective collecting channels formed by the walls of the outlet flow openings in this battery box 2.

The embodiment according to FIG. 5 represents, to a certain extent, a combination of the options according to FIGS. 3 and 4. That is, the base area of the present two cell groups 6 is formed by two cells 1 which are arranged end to end one behind the other. The alignment direction of the cells 1, which are arranged stacked one above the other, of a cell group 6 is inclined with respect to the vertical direction, making it possible to align the guide plate 15 in the vertical direction. The inlet flow opening 28 is arranged centrally in the base 4 of the battery box 2, while the two outlet openings 29, which are opposite one another, are arranged on the edge, in the region of the cover 5 of the battery box 2.

With respect to all the exemplary embodiments in FIGS. 1 to 5, it should be mentioned that, with the battery boxes 2 being of identical construction and with the cells 1 and cell groups 6 being arranged in an identical manner, the flow direction 13 of the fluid which is used to keep the cells at an appropriate temperature can be reversed since the effects of the flowing fluid is independent of the flow direction 13 in these cases.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A battery box having a plurality of orientation independent electrochemical cells, of the type in which said cells are arranged into at least one cell group, with flow channels formed between adjacent cells within said cell groups, through which a fluid can flow, a distributor channel being arranged in a first region of said box and coupled in fluid communication with said fluid flow channels at an inlet end thereof, and a collector channel being arranged in a second region of said box opposite said first region and coupled in fluid communication at an outlet end thereof, wherein:

in an installed orientation of said battery box, said cells are arranged in a horizontal orientation having the smallest dimension thereof in a vertical direction;

cells within a cell group are stacked one above the other;

each cell group has associated therewith inlet and outlet flow channels which extend transversely with respect to said battery box;

the transverse inlet flow channel is connected in fluid communication with the distributor channel and to the flow channels of a cell group associated therewith; and the transverse outlet flow channel being connected in fluid communication with the collecting channels and the flow channels of an associated cell group.

2. Battery box according to claim 1 wherein said cells are parallelepiped in shape, having flat sides thereof with the largest dimensions oriented approximately parallel to a base and cover of the battery box.

3. Battery box according to claim 1 wherein said cells are one of: dry cells, recombination cells, gel cells, and gas-tight cells with a bound electrolyte.

4. Battery box according to claim 1 wherein the transverse inlet flow channel and the transverse outlet flow channel are arranged at opposite ends of the cells of the cell group which form the base and the cover of a cell.

5. Battery box according to claim 1 wherein the transverse inlet flow channels have a cross-section which tapers in the flow direction, and the transverse outlet flow channels have a free cross-section which widens in the flow direction.

6. Battery box according to claim 1 wherein the cells of a cell group are arranged approximately in a straight line, aligned, one above the other.

7. Battery box according to claim 6 wherein alignment of said cells is parallel to the shortest edge of the cells.

8. Battery box according to claim 1 wherein the battery box has a plurality of cell groups which are arranged longitudinally on a pole bolt side thereof, one behind the other, and are spaced apart with their mutual separation ensured by spacer bars resting at the edge against the cells of the cell groups.

9. Battery box according to claim 1 wherein:

the battery box has a plurality of cell groups which are arranged longitudinally on a pole bolt side thereof, one behind the other, and are spaced apart, with their mutual separation ensured by spacer bars;

the spacer bars rest at the edge against edges of the cells of these cell groups, said edges being on end or pole bolt sides of the cells;

the spacer bars have a guide groove into which guide plates are introduced which guide the transverse flow of the fluid; and flat sides of the guide plates, together with the respectively opposite ends of the respective cells of these cell groups, form the transverse outlet flow channel of the first cell group and the transverse inlet flow channel of the second cell group.

10. Battery box according to claim 1 wherein:

the bottom cell of a cell group rests on a supporting ledge, which ensures the separation of a sealing plate placed above the base of the battery box;

a flow channel is formed between the sealing plate and the bottom cell of a cell group; and one channel of the collecting channel and distributor channel is arranged underneath the sealing plate, and the other channel is arranged above the top cell of one cell group and below the cover of the battery box.

11. Battery box according to claim 1 wherein:

the unobstructed width, through which flow can pass freely, of the distributor channel reduces in the flow direction and in that the unobstructed width, through which flow can pass freely, of the collecting channel increases in the flow direction.

* * * * *